United States Patent
Nogami

(10) Patent No.: US 11,400,547 B2
(45) Date of Patent: Aug. 2, 2022

(54) LASER MACHINE

(71) Applicant: FANUC CORPORATION, Yamanashi (JP)

(72) Inventor: Takeshi Nogami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 173 days.

(21) Appl. No.: 16/734,802

(22) Filed: Jan. 6, 2020

(65) Prior Publication Data
US 2020/0269349 A1    Aug. 27, 2020

(30) Foreign Application Priority Data

Feb. 25, 2019    (JP) .............................. JP2019-031180

(51) Int. Cl.
*B23K 26/08* (2014.01)
*B23K 26/082* (2014.01)

(52) U.S. Cl.
CPC ........ *B23K 26/0884* (2013.01); *B23K 26/082* (2015.10)

(58) Field of Classification Search
CPC .......................... B23K 26/082; B23K 26/0884
USPC ....................................... 219/121.6
See application file for complete search history.

(56) References Cited

U.S. PATENT DOCUMENTS

| | | | | | |
|---|---|---|---|---|---|
| 5,572,102 | A | * | 11/1996 | Goodfellow | ........... B25J 9/1697 219/124.1 |
| 2006/0060573 | A1 | * | 3/2006 | Becker | ............... B23K 26/0884 219/121.64 |
| 2015/0217449 | A1 | * | 8/2015 | Meier | .................. G05D 1/0088 901/1 |
| 2015/0290795 | A1 | * | 10/2015 | Oleynik | ................. G05B 19/42 700/257 |
| 2016/0059541 | A1 | * | 3/2016 | Kamoda | ................. B41F 11/02 101/147 |
| 2017/0348854 | A1 | * | 12/2017 | Oleynik | .................. A47J 47/02 |
| 2018/0169856 | A1 | * | 6/2018 | Murakami | ............... G06N 3/08 |

FOREIGN PATENT DOCUMENTS

JP    2007-283402    11/2007

* cited by examiner

*Primary Examiner* — Dana Ross
*Assistant Examiner* — Joseph W Iskra
(74) *Attorney, Agent, or Firm* — Wenderoth, Lind & Ponack, L.L.P.

(57) ABSTRACT

A laser machine includes a scanner configured to irradiate a workpiece with a laser beam, a robot configured to move the scanner, a robot controller configured to control the robot, and a scanner controller configured to control the scanner so as to control an irradiation position of the laser beam. The scanner controller includes a learned model obtained through supervised learning based on training data including, as input data, drive information relating to the robot at times when the scanner is moved in advance in a plurality of directions and speeds, and as correct data, actual position data and actual posture data of the attached scanner at the times. The actual position data and the actual posture data are calculated on the basis of the drive information relating to the robot in the learned model, and a robot movement consideration/calculation unit compensates the irradiation position of the laser beam.

4 Claims, 8 Drawing Sheets

LASER MACHINE

This application is based on and claims the benefit of priority from Japanese Patent Application No. 2019-031180, filed on 25 Feb. 2019, the content of which is incorporated herein by reference.

BACKGROUND OF THE INVENTION

Field of the Invention

The present invention relates to a laser machine.

Related Art

A remote laser welding robot system which includes a galvano scanner attached to the tip (hand part) of a robot and performs laser welding receives much attention, and has been put to practical use. According to the present art, a robot is capable of performing welding in an arbitrary shape while moving without stopping the operation. In order to realize such operation, the position/posture information of the robot in operation is transmitted from a robot controller to a scanner controller, and the scanner controller generates a route by taking into consideration the operation of the robot. The robot controller has a program for a movement command to the robot, and controls a motor of the robot. The scanner controller has a program in which an irradiation position of a laser beam and an output condition (power) of the laser beam are written, and controls a motor of the scanner and an output of the laser beam.

(Refer to Patent Document 1)

As described above, position/posture information of a TCP (tool center point) of a robot is transmitted to a scanner controller in real time, whereby the robot is able to perform welding at a desired position while moving (so-called on-the-fly control).

Patent Document 1: Japanese Unexamined Patent Application, Publication No. 2007-283402

SUMMARY OF THE INVENTION

A robot controller configured to control a robot is provided separately from a scanner controller configured to control a laser scanner, and each operation is thus controlled independently. Therefore, it is difficult to control the robot and the laser scanner in close cooperation with each other, and the operation of the laser scanner is controlled later than the operation of the robot. In addition, mechanical bending occurs, which is hardly detected on the basis of the command position/posture information of motors of each axis of the robot. Therefore, an irradiation position of a laser beam may be slightly shifted from a desired welding position.

For this reason, a remote laser welding robot system is desired, capable of performing welding by irradiating a desired welding position with a laser beam.

(1) One aspect of the present disclosure relates to a laser machine, which includes a laser irradiation apparatus configured to irradiate a workpiece with a laser beam, a robot configured to move, relative to the workpiece, the laser irradiation apparatus attached to the robot, a laser irradiation controller configured to control the laser irradiation apparatus so as to control an irradiation position of the laser beam, and a robot controller configured to control the robot so as to control at least one of a position and a posture of the attached laser irradiation apparatus. The robot controller includes a feedback unit configured to transmit, to the laser irradiation controller, drive information including information relating to a command speed and information relating to a command position and a command posture of the robot configured to control at least one of the position and the posture of the attached laser irradiation apparatus. The laser irradiation controller includes a learned model obtained in advance through supervised learning based on training data including, as input data, drive information relating to the robot at times when the robot controller moves in advance the attached laser irradiation apparatus in a plurality of directions and speeds, and as correct data, actual position data and actual posture data of the attached laser irradiation apparatus at the times, and a compensation unit configured to compensate the irradiation position of the laser beam, on the basis of the actual position data and the actual posture data of the laser irradiation apparatus calculated by the learned model in real time on the basis of the drive information received from the feedback unit.

According to one aspect of the present invention, a remote laser welding robot system is capable of performing welding, by irradiating a desired welding position on a workpiece with a laser beam.

DETAILED DESCRIPTION OF THE INVENTION

Figure 1:
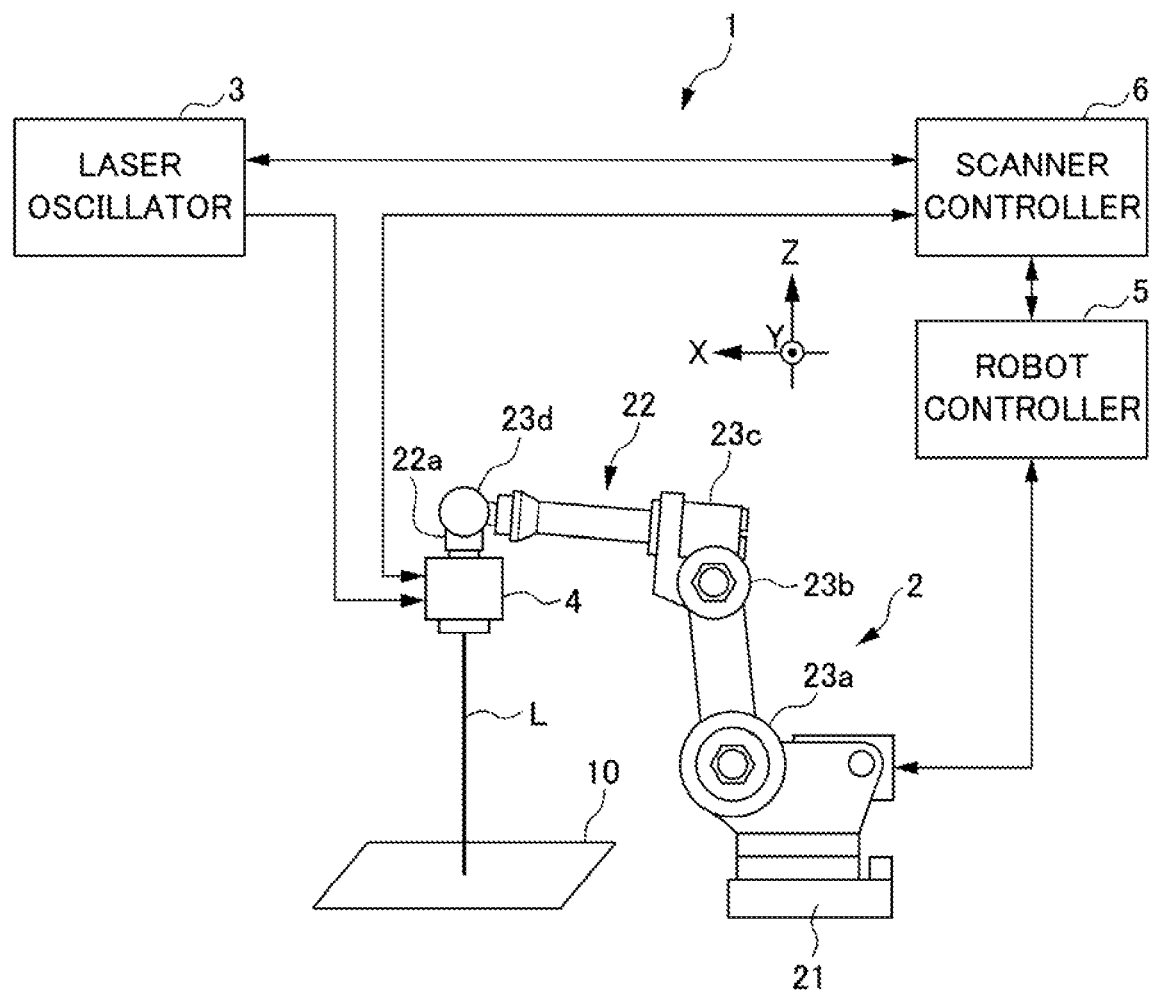
FIG. 1 is a block diagram illustrating an overall configuration of a laser machine.

One embodiment will be described below by referring to the drawings.

[Overall Configuration of Laser Machine]

Figure 2:
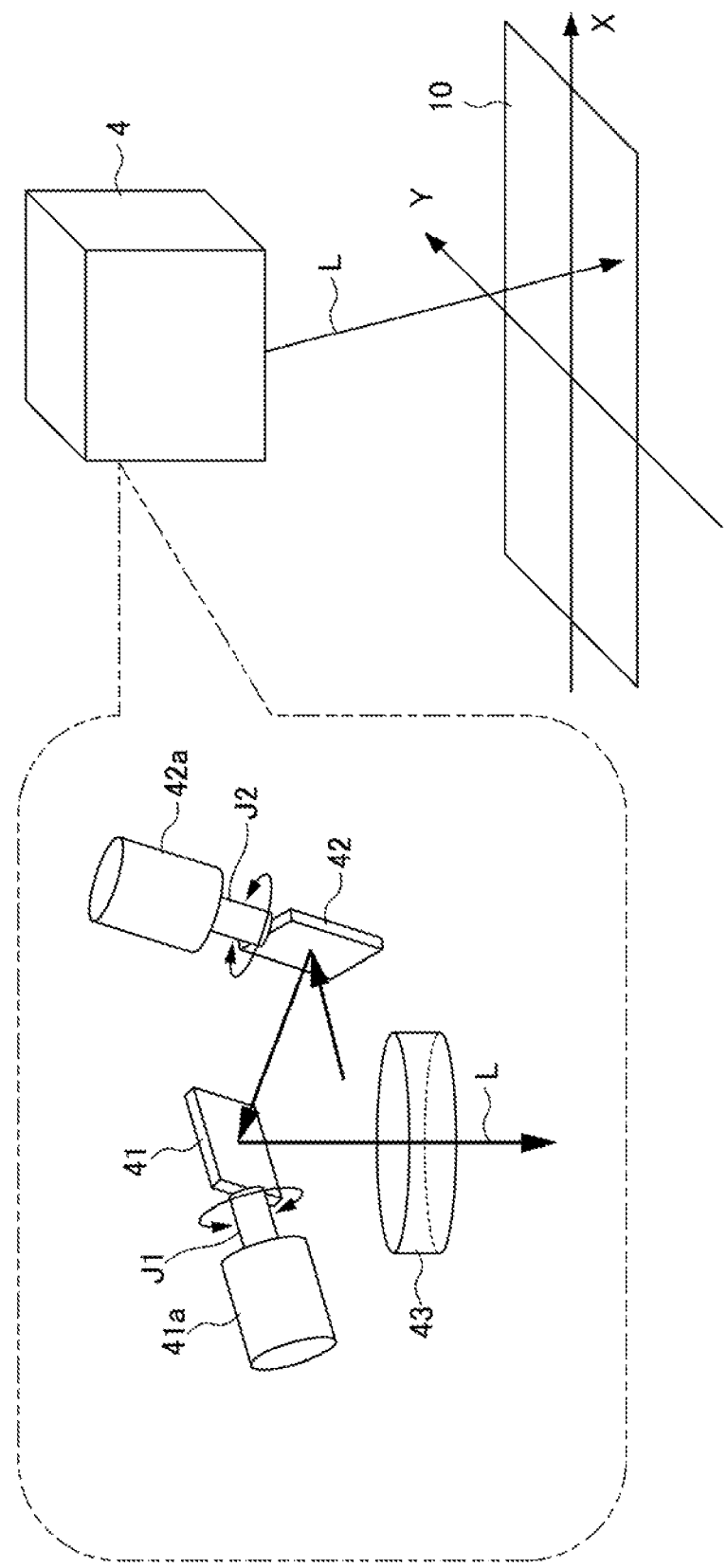
FIG. 2 is a diagram for explaining an optical system of a scanner in the laser machine.

FIG. 1 is a block diagram illustrating an overall configuration of a laser machine according to the present embodiment, and illustrating one embodiment of the laser machine configured as a remote laser welding robot system, as an example. FIG. 2 is a diagram for explaining an optical system of a scanner 4 in the laser machine according to the present embodiment. The same or corresponding parts in respective drawings are denoted by the same reference numerals. A laser machine 1 includes a robot 2 serving as a scanner moving apparatus, a laser oscillator 3, the scanner 4 serving as a laser irradiation apparatus, a robot controller 5, and a scanner controller 6 serving as a laser irradiation controller.

The robot 2, which is an articulated type robot having a plurality of joints, includes a base 21, an arm 22, and a plurality of joint shafts 23a to 23d each having a rotary axis extending in a Y direction. The robot 2 further includes a plurality of robot motors, such as the robot motor (not shown) configured to rotationally move the arm 22 around a rotary axis along a Z direction, and the robot motors (not shown) configured to rotate the joint shafts 23a to 23d respectively to move the arm 22 in an X direction. Each of the robot motors is rotationally driven on the basis of the drive data received from the robot controller 5 to be described below.

The scanner 4 is fixed to a tip part 22a of the arm 22 of the robot 2. Therefore, the robot 2 is capable of moving a workpiece 10 in the X, Y, Z directions at a predetermined robot speed, and further capable of rotating the workpiece 10 around the X, Y, Z axes, by rotational driving of respective robot servo motors. Accordingly, the robot 2 is capable of moving the workpiece 10 to an arbitrary position in a work space, and further capable of changing the posture of the workpiece 10. It is noted that a direction of the movement of the robot in actual welding is limited to directions substantially on an XY plane. As for the robot speed, the robot may not be moved at a fast speed because welding takes some time. Specifically, the robot is moved at a speed in the range of 30 to 120 mm/second, in many cases. As for the posture, the robot rotatable by, for example, approx. 15 degrees respectively around the X, Y, Z axes is capable of covering the actual movement, in many cases.

The laser oscillator 3 is configured with a laser medium, an optical resonator, an excitation source and the like (not shown). The laser oscillator 3 generates a laser beam having laser output based on a laser output command from the scanner controller 6 to be described below, and outputs the generated laser beam to the scanner 4. Example types of a laser beam to be oscillated include a fiber laser beam, a $CO_2$ laser beam, and a YAG laser beam. The present invention is not limited to a specific type of a laser beam.

The scanner 4 is a galvano scanner configured to receive a laser beam L output by the laser oscillator 3 to scan the workpiece 10 with the laser beam L. FIG. 2 is a diagram for explaining an optical system of the scanner 4 shown in FIG. 1. As shown in FIG. 2, the scanner 4 includes two galvano mirrors 41, 42 configured to reflect the laser beam L output by the laser oscillator 3, galvano motors 41a, 42a configured to rotationally drive the galvano mirrors 41, 42, respectively, and a cover glass 43.

The galvano mirrors 41, 42 are configured to be rotatable respectively around two rotary shafts J1, J2 which are set orthogonal to each other. The galvano motors 41a, 42a are rotationally driven on the basis of the drive data received from the scanner controller 6 to be described below, thereby rotating the galvano mirrors 41, 42 around the rotary shafts J1, J2, independently.

The laser beam L output by the laser oscillator 3 is sequentially reflected by the two galvano mirrors 41, 42, and thereafter output from the scanner 4 to reach a machining point (welding point) on the workpiece 10. In this case, the galvano motors 41a, 42a rotate the two galvano mirrors 41, 42, respectively, and accordingly the incident angles of the laser beam L incident on the galvano mirrors 41, 42 are changed continuously. As a result, the workplace 10 is scanned along a predetermined route with the laser beam L output from the scanner 4, and a welding path is thus formed on the workpiece 10 along the scanning route of the laser beam L.

The rotational driving of the galvano motors 41a, 42a is appropriately controlled to change the rotation angles of the galvano mirrors 41, 42, thereby enabling to arbitrarily change the scanning route of the laser beam L output on the workpiece 10 from the scanner, in the X, Y directions.

The cover glass 43, which is formed in a cylindrical shape, has the functions of transmitting the laser beam L sequentially reflected by the galvano mirrors 41, 42 toward the workpiece 10, and further of protecting the inside of the scanner 4.

Figure 3:
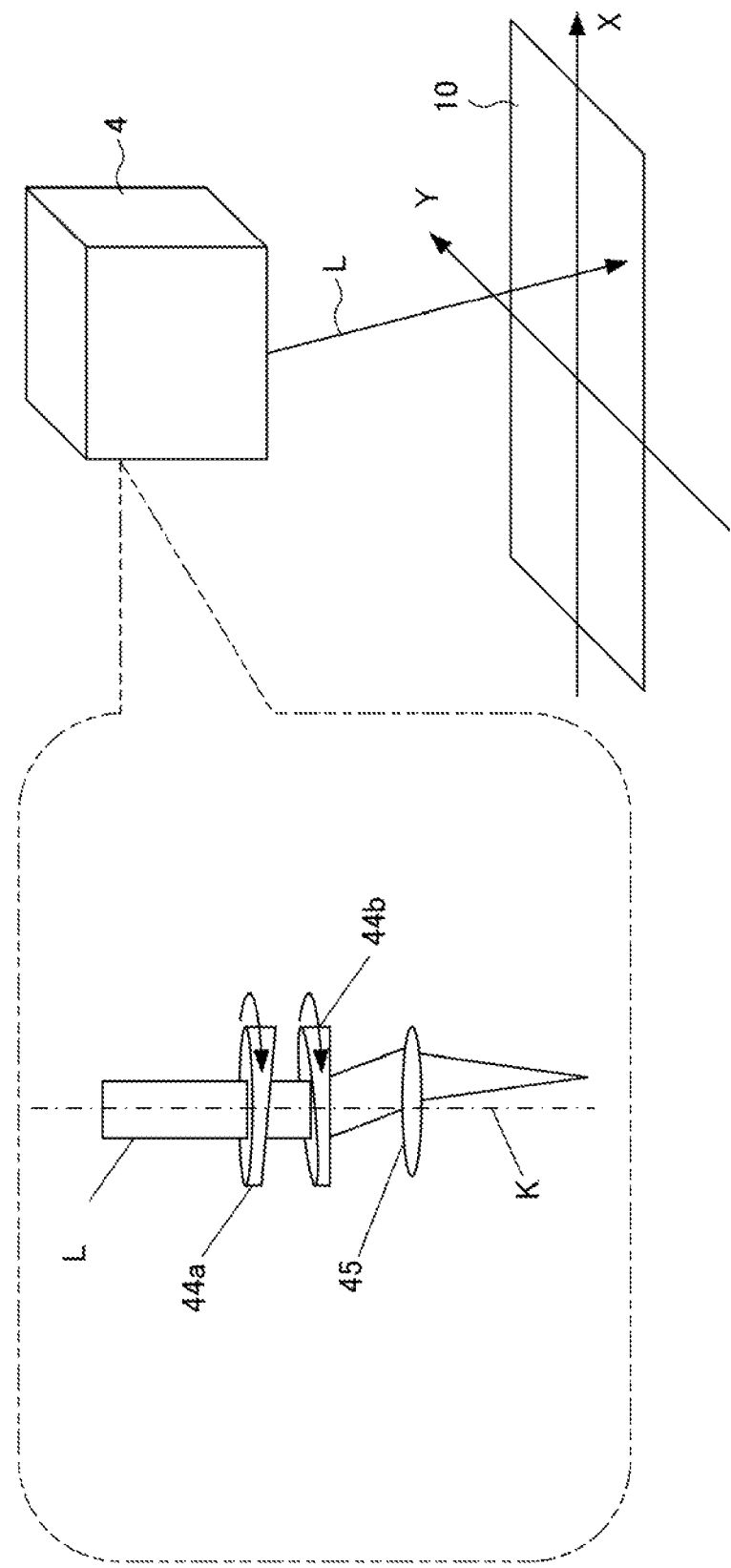
FIG. 3 is a diagram for explaining another optical system of the scanner shown in FIG. 1.
Figure 4A:
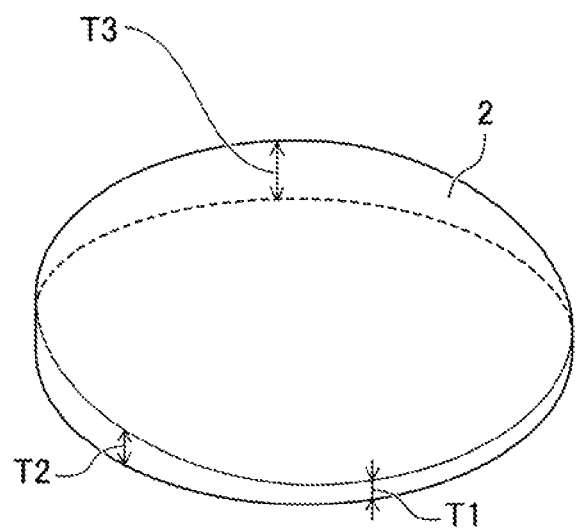
FIG. 4A is a diagram for explaining another optical system of the scanner shown in FIG. 3.
Figure 4B:
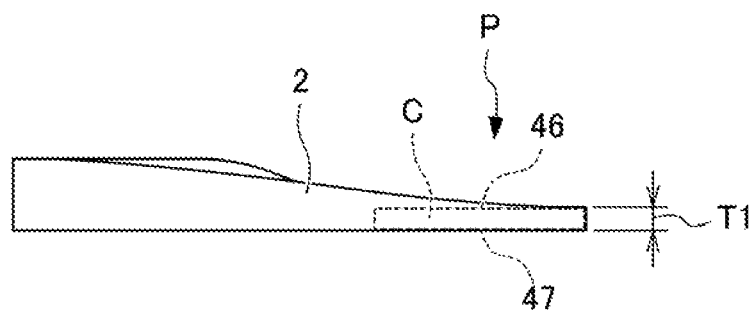
FIG. 4B is a diagram for explaining another optical system of the scanner shown in FIG. 3.
Figure 4C:
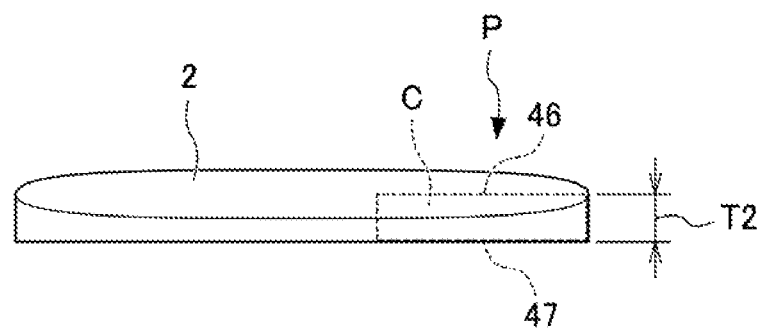
FIG. 4C is a diagram for explaining another optical system of the scanner shown in FIG. 3.
Figure 4D:
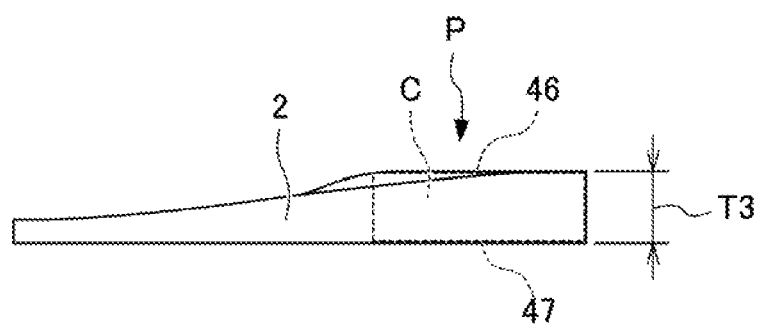
FIG. 4D is a diagram for explaining another optical system of the scanner shown in FIG. 3.

Alternatively, as shown in FIG. 3, the scanner 4 may be a trepanning scanner. In an example, the scanner 4 of a trepanning scanner may have such a configuration that a motor rotates a lens having one tilted face to refract an incident laser beam so as to irradiate an arbitrary position.

Specifically, the scanner 4 includes two prism lenses 44a, 44b (hereinafter, collectively referred to as "prism lens 44" in some cases) and a focusing lens 45 are superposed so that the laser beam L is made incident in the thickness direction thereof. The two prism lenses 44a, 44b rotate around a rotary axis K, whereby the irradiation position is able to be controlled on a two-dimensional plane.

As shown in FIG. 4A to FIG. 4D, the prism lens 44 is formed in, for example, a circular shape, and has a side 46 of an incident side (hereinafter, referred to as an incident side 46) and a side 47 of an emitting side (hereinafter, referred to as an emission side 47) in a cross section C in the direction of a thickness T, wherein the incident side 46 and the emission side 47 are disposed mutually in parallel. That is, the thickness T of the prism lens 44 is constant in the radial direction thereof. On the other hand, the thickness T of the prism lens 44 continuously varies in the circumferential direction thereof. Specifically, as shown in FIG. 4A to FIG. 4D, the thickness T of the prism lens 44 varies as represented by, for example, thicknesses T1, T2, T3, wherein the thicknesses are set in the relation of T1<T2<T3. The prism lens 44 is rotationally driven by a rotary motor, whereby the thickness T continuously varies along the rotational direction.

The laser beam L made incident on the prism lens 44 is refracted depending on a refractive index of the prism lens 44 and output as refracted light. In this case, the beam position of the laser beam L shifted by the refraction is correlated with the thickness T of the prism lens 44. That is, the thicker the thickness T of the prism lens 44 at an incident position P of the laser beam L is, the greater the shift amount corresponding to the shift of the beam position of the laser beam L caused by the refraction is. The laser beam L is made to pass through the prism lens 44 which continuously and periodically varies in the thickness T in the rotation direction, thereby enabling to continuously and periodically change the beam position of the laser beam L, that is, the irradiation position of the laser beam L.

By referring to FIG. 1 again, the robot controller 5 controls the operation of the robot 2 by outputting drive control data to respective robot servo motors of the robot 2, on the basis of a predetermined work program (including a robot moving route). That is, the robot controller 5 controls the rotation drive of the respective robot servo motors by outputting the drive control data to the respective robot servo motors, thereby moving the scanner 4 attached to the tip part 22a of the arm 22 in the X, Y, Z directions, and further rotating the scanner 4 around the X, Y, Z axes. Accordingly, the robot controller 5 changes the position and posture of the robot 2, that is, the position and posture (for example, rotation angle) of the scanner 4. The robot controller 5 further supplies the information (for example, command values) relating to the position and posture of the robot 2, that is, the position and posture of the scanner 4, to the scanner controller 6. Specifically, the position of the robot 2 is the position of the tip part 22a of the robot 2, that is, the position of the scanner 4. The posture of the robot 2 is the posture of the tip part 22a of the robot 2, that is, the posture (for example, rotation angle) of the scanner 4. The robot controller 5 controls the rotation drive of the respective robot motors by outputting the drive control data to the respective robot motors, thereby moving the scanner 4 attached to the tip part 22a of the arm 22 in, for example, directions substantially on an XY plane, relative to the workpiece 10, as described above. The robot controller 5 further moves the scanner 4 at a speed in the range of, for example, 30 to 120 mm/s. The robot controller 5 further rotates the posture of the scanner 4 by, for example, approx. 15 degrees at the maximum around the X, Y, Z axes, respectively.

The scanner controller c controls the operation of the scanner 4 independently from the control of the operation of the robot 2 by the robot controller 5. The scanner controller 6 outputs, to the laser oscillator 3, a laser output command to output a laser beam having desired output, on the basis of a predetermined work program (including machining conditions (irradiation conditions of a laser beam such as power, frequency and duty)). The scanner controller 6 further rotates the galvano mirrors 41, 42 by outputting the drive control data to the galvano motors 41a, 42a of the scanner 4, on the basis of a predetermined work program (including a machining route), thereby controlling the scanning with the laser beam L output from the scanner 4 to the workpiece 10.

Each of the robot controller 5 and the scanner controller 6 is configured with an operation processor such as a DSP (digital signal processor) or an FPGA (field-programmable gate array). The functions of the robot controller 5 and the scanner controller 6 are realized by, for example, executing predetermined software (program) stored in a storage unit. The functions of the robot controller 5 and the scanner controller 6 may be realized by cooperation of hardware and software, or may be realized only by hardware (electronic circuit).

Figure 5:
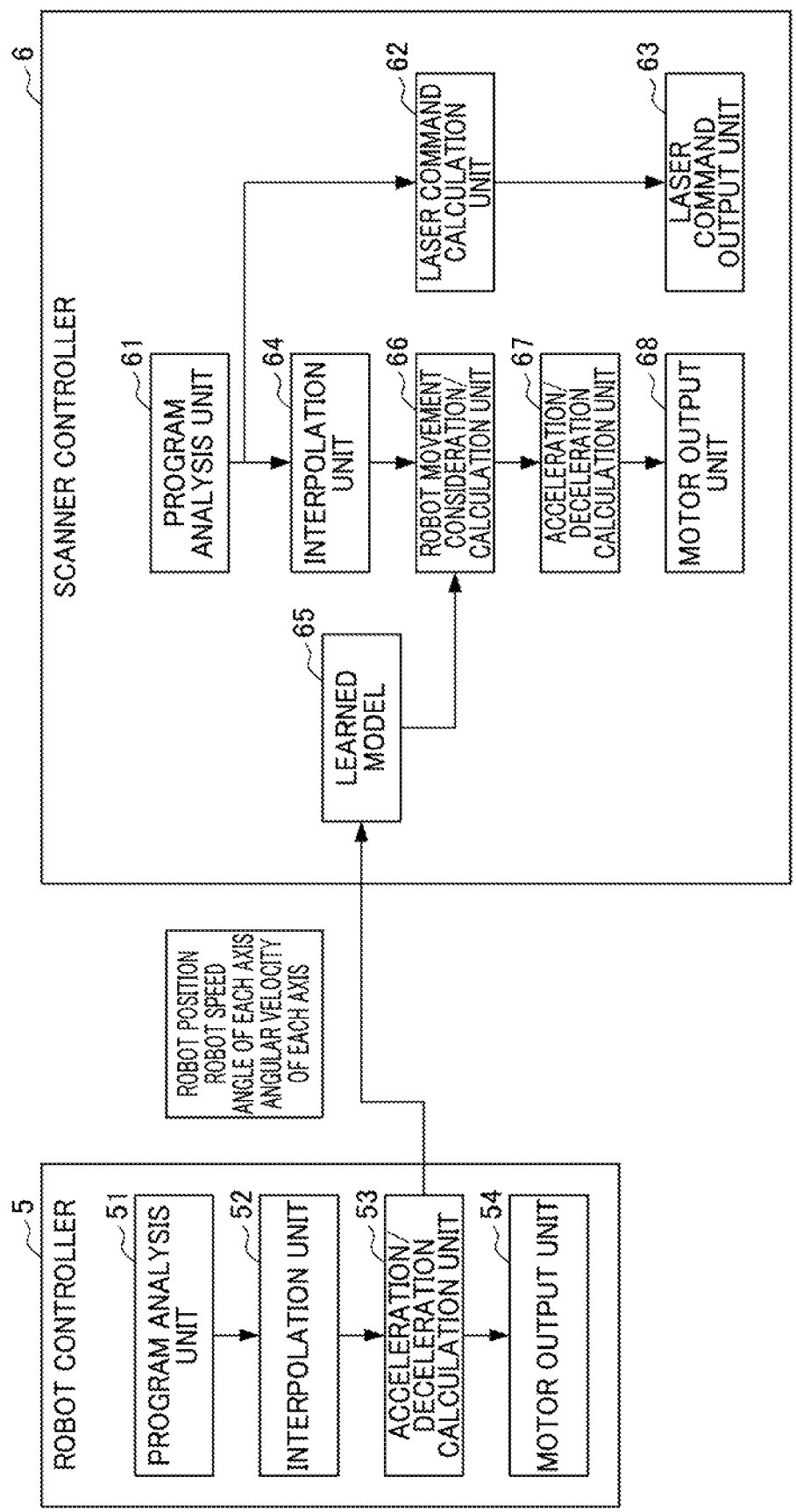
FIG. 5 is a diagram illustrating configurations of the robot controller and the scanner controller shown in FIG. 1.

The configurations of the robot controller 5 and the scanner controller 6 are described below in a further detailed manner. FIG. 5 is a diagram illustrating the configurations of the robot controller 5 and the scanner controller 6 in the laser machine 1 according to the present embodiment. The robot controller 5 includes a program analysis unit 51, an interpolation unit 52, an acceleration/deceleration calculation unit 53 serving as a feedback unit, and a motor output unit 54.

The program analysis unit 51 analyzes the machining program including the teaching points which are input through an input device (not shown) to the robot controller 5, and generates the operation command information relating to a moving route of the robot 2 (that is, a moving route of the scanner 4 attached to the tip part 22a) and a target move speed of the robot 2. The generated operation command information is output to the interpolation unit 52.

The interpolation unit 52 generates interpolation information by interpolating the moving route of the robot 2 on the basis of the operation command information output by the program analysis unit 51. In an example, the interpolation unit 52 interpolates the moving route of the robot 2 (that is, the moving route of the scanner 4 attached to the tip part 22a) between teaching points, so as to obtain a smooth route along a desired machining route. The generated interpolation information is output to the acceleration/deceleration calculation unit 53.

The acceleration/deceleration calculation unit 53 generates the drive information of respective robot servo motors for making the robot 2 (that is, the scanner 4 attached to the tip part 22a) move along the moving route of the robot 2, by performing acceleration/deceleration processing to the operation of the robot 2, on the basis of the interpolation information output by the interpolation unit 52 and respective preset parameters. The generated drive information of respective robot motors is output to the motor output unit 54. The drive information includes the command values of the position and posture of the robot 2 (the position and posture (for example, angle of each axis) of the scanner 4 attached to the tip part 22a), and of the move speed (a speed of the scanner 4 attached to the tip part 22a and angular velocity of each axis). The information relating to these command values is supplied to the scanner controller 6.

The motor output unit 54 generates the drive data of respective robot servo motors on the basis of the drive information output by the acceleration/deceleration calculation unit 53. Specifically, the motor output unit 54 generates the drive data of respective robot servo motors, on the basis of, for example, the error in speed (or the positional error) between a speed command (or a position command) in the drive information and the speed feedback (or positional feedback) detected by the encoders provided in the respective robot servo motors. The motor output unit 54 drives the respective robot servo motors on the basis of the generated drive data.

The scanner controller 6 includes a program analysis unit 61, a laser command calculation unit 62, a laser command output unit 63, an interpolation unit 64, a learned model 65, a robot movement consideration/calculation unit 66 serving as a compensation unit, and an acceleration/deceleration calculation unit 67, and a motor output unit 68.

The program analysis unit 61 generates operation command information relating to a scanning route (irradiation route) and a scanning speed (irradiation speed) of the scanner 4 as well as the machining conditions, by analyzing the machining program input through an input device (not shown) to the scanner controller 6. The program analysis unit 61 then outputs the generated operation command information to the interpolation unit 64 and the laser command calculation unit 62.

The laser command calculation unit 62 generates laser output information so that the laser beam L output from the scanner 4 has desired laser output, on the basis of the operation command information (machining conditions) output by the program analysis unit 61, and then generates oscillation information of the laser oscillator 3 on the basis of the generated laser output information. The generated oscillation information of the laser oscillator 3 is output to the laser command output unit 63.

The laser command output unit 63 generates oscillation control data of the laser oscillator 3 on the basis of the oscillation information output by the laser command calculation unit 62, to control the laser oscillator 3 on the basis of the generated oscillation control data.

The interpolation unit 64 generates interpolation information, by interpolating the scanning route (irradiation route) of the scanner 4 on the basis of the operation command information (scanning route) output by the program analysis unit 61. The generated interpolation information is output to the robot movement consideration/calculation unit 66.

Figure 6:
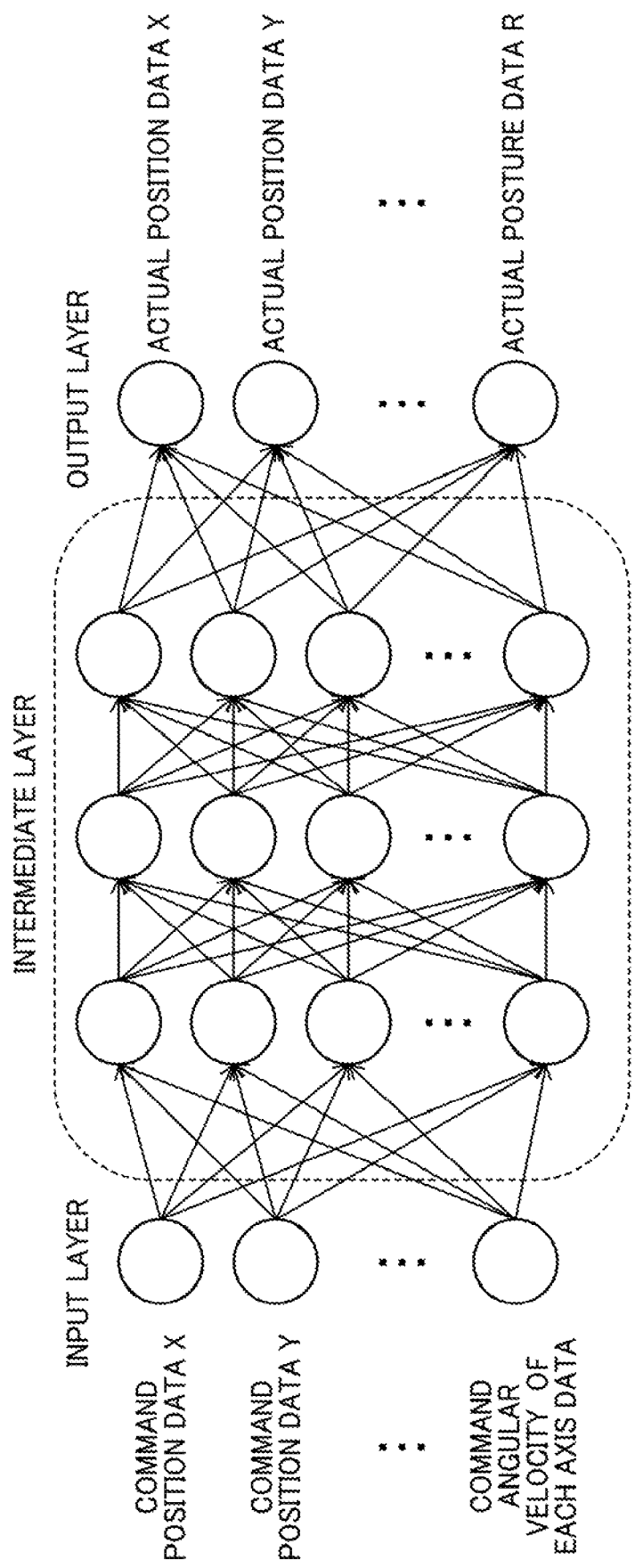
FIG. 6 is a diagram illustrating one example of a learned model included in the scanner controller shown in FIG. 5.

The learned model 65 is obtained in advance through the supervised learning based on the training data which includes, as input data, the drive information relating to the robot 2 at times when the robot controller 5 moves in advance the scanner 4 attached to the robot 2 in a plurality of directions and speeds, and as correct data, the actual position data and the actual posture data of the attached scanner 4 at the times. The drive information relating to the robot 2 herein indicates the command values of the position and posture, the speed command value, the angle command values of each axis, and angular velocity command values of the respective axes, with respect to the scanner attached to the tip part of the robot 2. FIG. 6 shows one example of the learned model 65. As shown in FIG. 6, the learned model 65 serves as a multilayer neural network having, for example, the drive information as an input layer and the actual position data and the actual posture data of the scanner 4 as an output layer. The learned model 65 is generated by a machine learning apparatus 7 to be described below.

In the case where the robot 2 is in an on-mode where the robot 2 operates, the robot movement consideration/calculation unit 66 compensates the interpolation information (scanning route) output by the interpolation unit 64, taking into consideration the operation of the robot 2 on the basis of the actual position data and the actual posture data of the scanner 4 output by the learned model 65. The robot movement consideration/calculation unit 66 calculates the rotation speeds of the galvano mirrors 41, 42, on the basis of the compensated interpolation information (scanning route) and preset parameters. On the other hand, in the case where the robot 2 is in an off-mode where the robot 2 does not operate, the robot movement consideration/calculation unit 66 calculates the rotation speeds of the galvano mirrors 41, 42, on the basis of the interpolation information (scanning route) output by the interpolation unit 64 and preset parameters. The data on the rotation speeds calculated by the robot movement consideration/calculation unit 66 is output to the acceleration/deceleration calculation unit 67.

The acceleration/deceleration calculation unit 67 generates drive information of the respective galvano motors 41a, 42a for scanning with the laser beam L along the scanning route (irradiation route) and at the scanning speed (irradiation speed), by performing acceleration/deceleration processing to the galvano motors 41a, 42a on the basis of the rotation speed information of the galvano mirrors 41, 42 output by the robot movement consideration/calculation unit 66 and respective parameters. The generated drive information of the galvano motors 41a, 42a is output to the motor output unit 68.

The motor output, unit 68 generates drive control data of the galvano motors 41a, 42a on the basis of the drive information output by the acceleration/deceleration calculation unit 67, to respectively drive the galvano motors 41a, 42a on the basis of the generated drive control data. Accordingly, in the laser machine 1, the scanner 4 performs scanning with a laser beam while the robot 2 moves the scanner 4, whereby the workpiece 10 is able to be welded (be machined) in an arbitrary shape.

<Machine Learning Apparatus 7>

Figure 7:
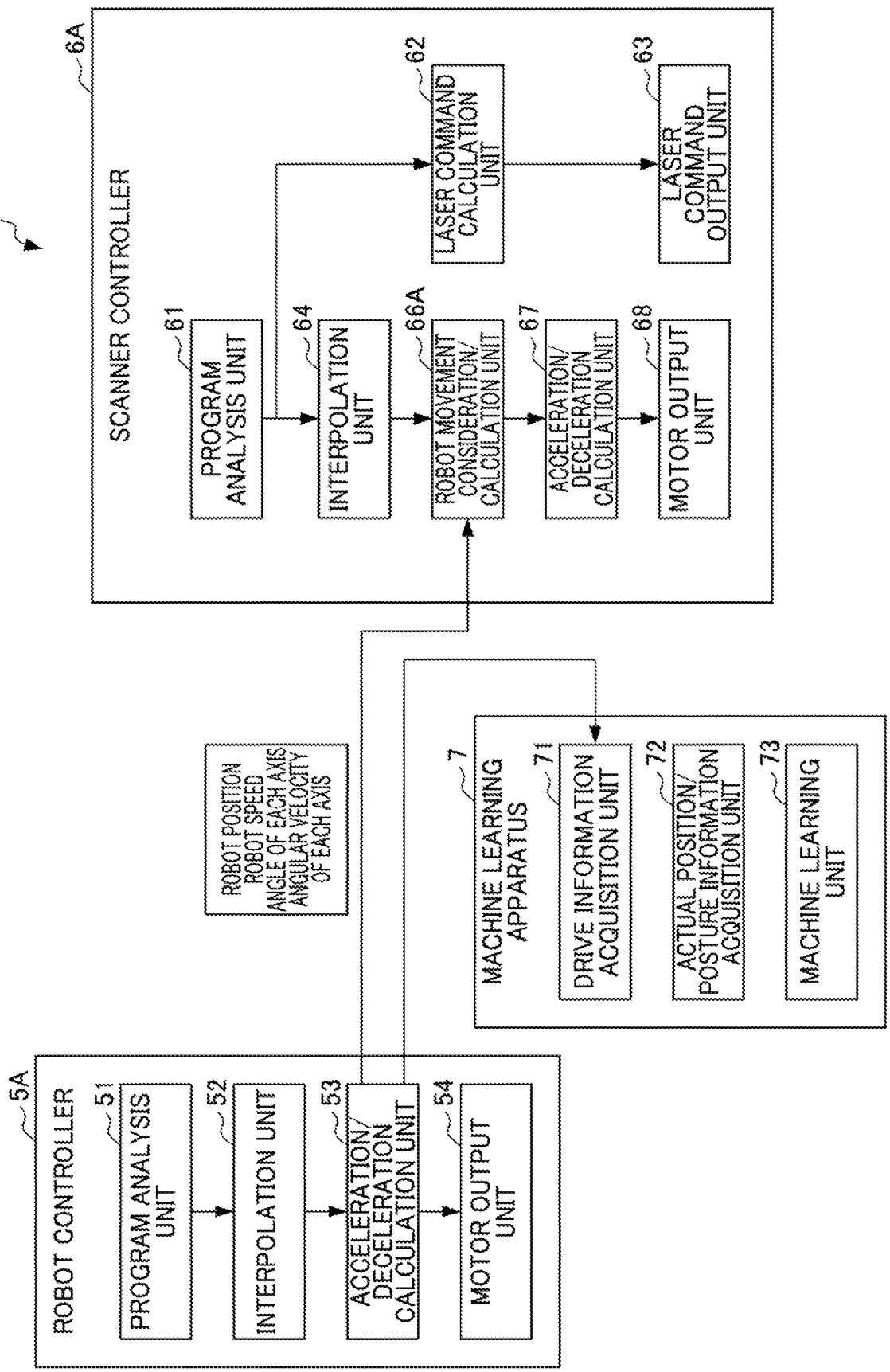
FIG. 7 is a diagram illustrating a configuration of a laser machine relating to machine learning.

As described above, the machine learning apparatus 7 performs the supervised learning based on the training data which includes, as input data, the drive information relating to the robot 2 at times when the robot controller 5 moves in advance the scanner 4 attached to the robot 2 in a plurality of directions and speeds, and as correct data, the actual position data and the actual posture data of the attached scanner 4 at the times. Through the supervised learning, the machine learning apparatus 7 generates the learned model 65 (neural network) using, as input values, the drive information of the respective robot servo motors for moving the robot 2 (that is, the scanner 4 attached to the tip part 22a) along the moving route generated by the robot controller 5 (the acceleration/deceleration calculation unit 53), and as output values, the actual position data and the actual posture data of the scanner 4, with respect to the command values. The neural network herein may be a multilayer neural network. FIG. 7 shows a schematic diagram of a system for performing machine learning. As shown in FIG. 7, the machine learning apparatus 7 includes a drive information acquisition unit 71, an actual position/posture information acquisition unit 72, and a machine learning unit 73. The drive information acquisition unit 71 acquires, from the robot controller 5, the drive information (the input data of the training data in machine learning) relating to the robot 2 at times when the attached scanner 4 is moved in advance in a plurality of directions and speeds.

A plurality of machining programs to acquire the drive information relating to the robot 2 at times when the robot 2 is moved in a plurality of directions and speeds are prepared. The plurality of machining programs perform, in order to acquire the drive information relating to the robot 2 at times when the scanner 4 is moved in advance in a plurality of directions and speeds, and the actual position data and the actual posture data of the scanner 4 at the times, control on the movement of the robot 2 changed in the direction, speed and posture for moving the scanner 4 in various directions and speeds, and adjustment with respect to output or non-output of a laser beam, adjustment of a laser irradiation direction, and the like, in the range satisfying the conditions where the scanner 4 attached to the robot 2 (the tip part 22a of the arm 22) is moved relative to the workpiece 10 in, for example, directions substantially on an XY plane, is moved at speeds in the range of, for example, 30 to 120 mm/s, and is rotated by, for example, approx. 15 degrees at the maximum around the X, Y, Z axes, respectively. As for a laser beam, a guide laser beam (a laser pointer beam) may be output, instead of an actual laser beam. In this case, a guide laser beam may be output to a plurality of preset irradiation positions of the scanner 4 in the same position and posture.

FIG. 7 shows a laser machine 1A of the case where a machining program for machine learning is executed. As shown in FIG. 7, the laser machine 1A includes the robot 2, the laser oscillator 3, the scanner 4, the robot controller 5A, and a scanner controller 6A. A robot controller 5A, which is basically the same as the robot controller 5 shown in FIG. 5, differs from the robot controller 5 in transmission destination of the drive information output by the acceleration/deceleration calculation unit 53, changed to a robot movement consideration/calculation unit 66A and the machine learning apparatus 7 (the drive information acquisition unit 71). The scanner controller 6A, which is basically the same as the scanner controller 6 shown in FIG. 5, differs in configuration from that of the scanner controller 6 of the laser machine 1 shown in FIG. 5, not including the learned model 65, but including the robot movement consideration/calculation unit 66A instead of the robot movement consideration/calculation unit 66. Specifically, the robot movement consideration/calculation unit 66A compensates the interpolation information (scanning route), on the basis of the interpolation information (scanning route) output by the interpolation unit 64, and the drive information (the position and posture of the robot 2 (the position and posture of the scanner 4 attached to the tip part 22a)) and the move speed (the command values of the speed of the scanner 4 attached to the tip part 22a and the angular velocity of each axis) received from the robot controller 5A (the acceleration/deceleration calculation unit 53), and calculates the rotation speeds of the respective galvano mirrors 41, 42 on the basis of preset parameters. In the case where a guide laser beam is output to a plurality of preset irradiation positions of the scanner 4 in the same position and posture, the robot movement consideration/calculation unit 66A may calculate a plurality of rotation speeds for each of the galvano mirrors 41, 42, corresponding to the plurality of irradiation positions.

This allows the machine learning apparatus 7 (the drive information acquisition unit 71) to acquire the drive information relating to the robot 2 at times when the robot controller 5A moves the attached scanner 4 in the plurality of directions and speeds in advance.

In the case where the machining program for machine learning described above is executed, the actual position/posture information acquisition unit 72 acquires the actual position data and the actual posture data (the correct data of the training data in machine learning) of the scanner 4 at the time when the robot 2 is moved on the basis of the drive information generated by the robot controller 5A (the acceleration/deceleration calculation unit 53). Specifically, a photo sensor (not shown) is installed to a position on the workpiece 10 to sense the guide laser beam output from the scanner 4 at the time when the robot 2 is moved on the basis of the drive information, and the actual position/posture information acquisition unit 72 calculates, on the basis of the data of the position actually irradiated with the guide laser beam, the actual position data and the actual posture data of the scanner 4. In an example, the actual position/posture information acquisition unit 72 may calculate the actual position and posture of the scanner 4, by measuring the difference between the position to be irradiated in the command and the actually irradiated position, by use of the photo sensor. It is noted that the method for calculating the actual position and posture of the scanner 4 is not limited thereto. In the case where a sensor is capable of measuring the position and posture of an object, the position and posture may be calculated on the basis of the values output by the sensor. For example, a magnetic sensor may serve as a sensor, in which the receiver attached to an object detects the magnetic field generated by a transmitter, thereby measuring a position and posture. An optical sensor may serve as a sensor, in which the camera fixed in a scene captures an image of the maker disposed on the scanner 4, thereby measuring a position and posture. Moreover, any other sensor is available as long as the sensor is capable of measuring a position and posture at six degrees of freedom. In such a method, the position and posture of the scanner 4 is able to be measured precisely. As described above, the machine learning apparatus 7 is capable of generating the training data which includes, as input data, the drive information relating to the robot 2 at times when the robot controller 5 moves in advance the scanner 4 attached to the robot 2 in a plurality of directions and speeds, and as correct data, the actual position data and the actual posture data of the attached scanner 4 at the times.

The machine learning apparatus 7 executes a known supervised learning on the basis of the training data (also referred to as "teacher data") generated as described above, thereby generating the learned model 65 which outputs the actual position data and the actual posture data of the scanner 4 at the time, by using as input data, the drive information including the information relating to the command position and posture of the robot 2 equipped with the scanner 4 and the information relating to the command speed.

As described above, an arbitrary laser machine 1 (including, for example, a remote laser welding robot system) in one aspect of the present invention is capable of performing welding, by irradiating a desired position on a workpiece with a laser beam. Specifically, the scanner controller 6 performs compensation, taking into consideration the actual position and the actual posture of the scanner 4, by acquiring the data relating to the command position and the command posture of the scanner 4, the data relating to the command speed and the like from the robot controller 5, whereby highly precise welding is able to be performed with no shift from a planned command position.

In one aspect of the present invention, supervised learning is performed by use of, as input data, the data relating to the command position and the command posture of the scanner 4 and the data relating to the command speed, and as correct data (label), the actual position data and the actual posture data of the scanner 4 at the time, thereby generating the learned model 65 which outputs the actual position data and the actual posture data of the scanner 4 at the time, by using, as input data, the data relating to the command position and the command posture of the scanner 4, the data relating to the command speed, and the like. This enables to correspond to, for example, the shift caused by the mechanical bending during when the robot 2 is moved. In an example, even after the learned model 65 is generated, training data is newly generated, and the training data is re-learned so that the learned model 65 is updated, thereby enabling to perform highly precise welding.

In one aspect described above, a galvano scanner serves as the scanner 4. The present invention is not limited thereto. The scanner 4 may be, for example, a trepanning scanner instead of a galvano scanner.

In the case where a plurality of laser machines 1 having the same system configuration are disposed, the learned model 65 generated through the supervised learning performed by the machine learning unit 73 as described above is available in the respective laser machines 1. In each of the laser machines 1, the learned model 65 is included in an initial setting state, and training data is added, whereby efficient update of the learned model 65 is able to be performed.

In the description of the above embodiment, the machine learning apparatus 7 is disposed separately from the robot controller 5 and the scanner controller 6. The present invention is not limited thereto. In an example, the robot controller 5 may include all or some of the functions of the machine learning apparatus 7 (for example, at least one function part of the drive information acquisition unit 71, the actual position/posture information acquisition unit 72, and the machine learning unit 73). Similarly, the scanner controller 6 may include all or some of the functions of the machine learning apparatus 7 (for example, at least one function part of the drive information acquisition unit 71, the actual position/posture information acquisition unit 72, and the machine learning unit 73). Alternatively, all or some of the functions of the machine learning apparatus 7 may be realized by use of a virtual server on a cloud, or the like.

The embodiment described above is able to be realized by hardware, software, or the combination thereof. Being realized by software herein means that a computer reads and executes a program, whereby an embodiment is realized. In the case where the embodiment is configured with hardware, each of some or all parts in the embodiment may be configured with an IC (integrated circuit), for example, an LSI (large scale integrated circuit), an ASIC (application specific integrated circuit), a gate array, or an FPGA (field programmable gate array).

In the case where some or all parts of the embodiment are configured with the combination of software and hardware, a computer is configured with a storage unit such as a hard disk or a ROM configured to store a program in which all or some parts of the operation of a servo controller indicated in a flow chart are written, a DRAM configured to store data necessary for calculation, a CPU, and a bus connecting respective parts, and in the computer, the information necessary for calculation is stored in the DRAM, and a target program is executed by the CPU, whereby some or all parts of the embodiment are realized. Programs are stored by use of various types of computer-readable media, and are able to be supplied to a computer. The computer readable media include various types of tangible storage media. Examples of the computer-readable media include a magnetic recording medium (for example, a flexible disk, a magnetic tape, a hard disk drive), a magneto-optical recording medium (for example, a magneto-optical disk), a CD-ROM (read only memory), a CD-R, a CD-R/W, and a semiconductor memory (for example, a mask ROM, a PROM (programmable ROM), an EPROM (erasable PROM), a flash ROM, a RAM (random access memory)).

The scanner 4 may have three or more galvano mirrors configured to be rotated by individual galvano motors, respectively.

EXPLANATION OF REFERENCE NUMERALS

1 LASER MACHINE
2 ROBOT
3 LASER OSCILLATOR
4 SCANNER
41, 42 GALVANO MIRROR
41A, 42A GALVANO MOTOR
5 ROBOT CONTROLLER
51 PROGRAM ANALYSIS UNIT
52 INTERPOLATION UNIT
53 ACCELERATION/DECELERATION CALCULATION UNIT
54 MOTOR OUTPUT UNIT
6 SCANNER CONTROLLER
61 PROGRAM ANALYSIS UNIT
62 LASER COMMAND CALCULATION UNIT
63 LASER COMMAND OUTPUT UNIT
64 INTERPOLATION UNIT
65 LEARNED MODEL
66 ROBOT MOVEMENT CONSIDERATION/CALCULATION UNIT
67 ACCELERATION/DECELERATION CALCULATION UNIT
68 MOTOR. OUTPUT UNIT
7 MACHINE LEARNING APPARATUS
71 DRIVE INFORMATION ACQUISITION UNIT
72 ACTUAL POSITION/POSTURE INFORMATION ACQUISITION UNIT
73 MACHINE LEARNING UNIT
10 WORKPIECE
L LASER BEAM

What is claimed is:

1. A laser machine comprising:
a laser irradiation apparatus configured to irradiate a workpiece with a laser beam;
a robot configured to move, relative to the workpiece, with the laser irradiation apparatus attached to the robot;
a laser irradiation controller configured to control the laser irradiation apparatus so as to control an irradiation position of the laser beam; and
a robot controller configured to control the robot so as to control at least one of a position and a posture of the attached laser irradiation apparatus,
the robot controller including:
a feedback unit configured to transmit, to the laser irradiation controller, drive information including information relating to a command speed and information relating to a command position and a command posture of the robot configured to control at least one of the position and the posture of the attached laser irradiation apparatus,
the laser irradiation controller including:
a learned model obtained through supervised learning based on training data, the training data including, as input data, drive information relating to the robot at times when the robot controller moves the attached laser irradiation apparatus in a plurality of directions and speeds, and the training data including, as correction data, actual position data and actual posture data of the attached laser irradiation apparatus at the times when the robot controller moves the attached laser irradiation apparatus; and
a compensation unit configured to compensate the irradiation position of the laser beam, on a basis of the actual position data and the actual posture data of the laser irradiation apparatus calculated by the learned model in real time on a basis of the drive information received from the feedback unit,
wherein the learned model serves as a multilayer neural network having the drive information as an input layer and the actual position data and the actual posture data of the laser irradiation apparatus as an output layer.

2. The laser machine according to claim 1, wherein
the laser irradiation apparatus is a galvano scanner configured to perform scanning with the laser beam along a predetermined irradiation route at a predetermined irradiation speed,
the compensation unit is
configured to compensate the irradiation route and the irradiation speed of the galvano scanner, on the basis of the drive information received from the robot controller, and
the laser machine including an acceleration and deceleration calculation unit configured to generate drive information of a galvano motor driven for the scanning with the laser beam along the irradiation route at the irradiation speed.

3. The laser machine according to claim 1, the laser machine comprising a machine learning apparatus, the machine learning apparatus including:
a drive information acquisition unit configured to acquire the drive information relating to the robot at times when the robot controller moves the attached laser irradiation apparatus in a plurality of directions and speeds;
an actual position/posture information acquisition unit configured to acquire actual position data and actual posture data of the laser irradiation apparatus at a time when the robot is moved on a basis of the drive information; and a machine learning unit configured to generate the learned model through machine learning by using the drive information relating to the robot as input data, and the actual position data and the actual posture data of the laser irradiation apparatus as correction data.

4. The laser machine according to claim 3, wherein the machine learning unit generates the learned model as the multilayer neural network.

* * * * *